(12) United States Patent
Kimberg et al.

(10) Patent No.: US 10,002,353 B2
(45) Date of Patent: Jun. 19, 2018

(54) METHODS AND SYSTEMS FOR CONDUCTING TRANSACTIONS

(71) Applicants: Debbie Kimberg, Chesterfield, MO (US); Shawn Hagmeier, St. Peters, MO (US)

(72) Inventors: Debbie Kimberg, Chesterfield, MO (US); Shawn Hagmeier, St. Peters, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days. days.

(21) Appl. No.: 13/724,628

(22) Filed: Dec. 21, 2012

(65) Prior Publication Data

US 2014/0180849 A1    Jun. 26, 2014

(51) Int. Cl.
G06Q 20/00 (2012.01)
G06Q 20/38 (2012.01)

(52) U.S. Cl.
CPC ................................. G06Q 20/381 (2013.01)

(58) Field of Classification Search
None
See application file for complete search history.

(56) References Cited

U.S. PATENT DOCUMENTS

| | | | |
|---|---|---|---|
| 8,417,258 B2 * | 4/2013 | Barnes, Jr. ................ | 455/456.1 |
| 2006/0027647 A1 * | 2/2006 | Deane et al. ................ | 235/380 |
| 2008/0301047 A1 * | 12/2008 | Fish ..................... | G06Q 20/105 705/41 |
| 2009/0094134 A1 * | 4/2009 | Toomer et al. ................ | 705/26 |
| 2010/0250351 A1 * | 9/2010 | Gillenson et al. ......... | 705/14.13 |
| 2012/0232981 A1 * | 9/2012 | Torossian et al. ......... | 705/14.27 |
| 2012/0233073 A1 * | 9/2012 | Salmon ................ | G06Q 20/381 705/44 |
| 2012/0303425 A1 * | 11/2012 | Katzin ................ | G06Q 20/027 705/14.4 |
| 2013/0132217 A1 * | 5/2013 | Yahn et al. ..................... | 705/17 |
| 2013/0218657 A1 * | 8/2013 | Salmon ................. | G06Q 10/00 705/14.29 |

* cited by examiner

*Primary Examiner* — Fateh M Obaid
(74) *Attorney, Agent, or Firm* — Buckley Maschoff & Talwalkar LLC (57) ABSTRACT

According to some embodiments, a transaction may include receiving a funds transfer request, the funds transfer request specifying a source account associated with a first unit of value, a transaction amount, and a destination account associated with second unit of value, wherein the second unit of value is different than the first unit of value. The transaction may proceed with a response to the funds transfer request which is processed by automatically determining an exchange rate between the first and second units of value, wherein at least one of the first or second units of value is not a governmental currency, and automatically initiating a debit request to debit the transaction amount from the source account and automatically initiating a credit request to credit the transaction amount to the destination account.

25 Claims, 5 Drawing Sheets

METHODS AND SYSTEMS FOR CONDUCTING TRANSACTIONS

BACKGROUND

Embodiments disclosed herein relate to transaction systems. In particular, some embodiments relate to performing funds transfers, including funds transfers associated with loyalty or reward programs or other virtual currencies.

There are many types of virtual currencies. Merchants of all types use loyalty or reward programs to encourage consumer action. A consumer might have loyalty, reward, or gift card account balances at multiple merchants at any given time, and each of those accounts may be accessed through different cards or account access devices. Many consumers' wallets and purses are filled with different cards. Other loyalty or reward programs require the consumer to remember their login name and password to access a loyalty or reward account. It would be desirable to provide systems and methods that allow easier access to value from these different programs as well as the transfer of value between different programs. In other cases, virtual currencies are used for purchasing, such as Facebook credits to buy such items as virtual goods in games or birthday cards. The virtual currencies could be traded for real currency or could be bought using real currency through the card network.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a funds transfer system is provided that may, in some embodiments, be based on, or utilize features of, a payment card system such as that operated by MasterCard International Inc., the assignee hereof. Pursuant to some embodiments, some or all of the funds transferred in a transaction may be units of value that are not a governmental currency. For example, in some embodiments, the funds transferred may be or include rewards points, social network currency, store credit, virtual currency, or the like.

Pursuant to some embodiments, methods, systems, and computer code are provided that include receiving a funds transfer request, the funds transfer request specifying a source account associated with a first unit of value, a transaction amount, and a destination account associated with second unit of value, wherein the second unit of value is different than the first unit of value. A response to the funds transfer request is provided which includes automatically determining an exchange rate between the first and second units of value, wherein at least one of the first or second units of value is not a governmental currency. A payment transaction is automatically initiated to transfer the transaction amount from the source account to the destination account via a payment card system.

In some embodiments, a rewards transfer method may include one or more messages transmitted over a payment card system. For example, in some embodiments a rewards transfer method may include generating a message specifying a source account, a destination account, and a transfer amount. The message may be routed from a point of sale or point of transaction device to a rewards platform over a payment card network. The rewards platform may then perform processing to identify an exchange rate between a unit of value associated with the source account and a unit of value associated with the destination account. The rewards platform may then transmit one or more authorization request messages to a source account platform and the destination account platform causing a unit of value equivalent to the requested transfer amount to be debited from the source account and a unit of value equivalent to the requested transfer amount to be credited to the destination account. The authorization request message(s) may be transmitted and routed from the rewards platform to the source account platform and the destination account platform over a payment card network.

For convenience and ease of exposition, a number of terms are used herein. For example, the term "value" is used to refer to units of monetary or non-monetary value, where units of monetary value are referred to as "governmental currency" (e.g., such as the U.S. dollar or other government issued value) and where units of non-monetary value are referred to as "non-governmental currency" (e.g., such as Facebook credits, airline reward miles, etc.).

The term "payment card system" or "payment card network" is used to refer to a payment network (such as the BankNet system operated by MasterCard International Incorporated). However, those skilled in the art, upon reading this disclosure, will appreciate that other payment networks may be used with similarly desirable results.

To describe features of some embodiments, several illustrative, but not limiting, examples will now be introduced and which may be referenced throughout the remainder of this disclosure. In a first illustrative example, a consumer has a Bank of America® credit card. The card is a rewards card, and the consumer earns reward points based on usage of the card. The consumer wishes to convert a portion of those reward points to credits associated with her Apple® iTunes account. Embodiments allow such a conversion and transfer of value to occur. In a second illustrative example, a consumer is shopping at an electronics store, and purchases a new headphone for listening to music. While at the point of sale terminal at the store, she may choose to purchase $25 of credit that is transferred to her Apple® iTunes account. During the checkout process, the point of sale terminal may prompt the consumer to enter her Apple iTunes account identifier (which may be her email address) to facilitate the transfer of funds.

As another illustrative, but not limiting, example, a consumer has several loyalty or virtual currency accounts including a Facebook® Credits account and a Best Buy®

Rewards Zone loyalty account. The Facebook Credits account is accessed and used by the consumer using her Facebook user name and password, and her Best Buy Rewards Zone account is accessed using a unique identifier. In the illustrative example, the consumer is shopping at a retail store that provides access to the systems of the present invention (e.g., which has implemented point of sale terminal software allowing communication with the rewards system of the present invention), and at a point of sale location, the consumer is prompted with an option to perform a rewards transaction. The consumer opts to perform a rewards transaction and indicates that she wishes to transfer $100 of value from her Facebook Credits account to her Best Buy Rewards Zone account. An authorization request message including information specifying the consumer's Facebook Credits account, the Best Buy account, and the requested transaction amount is transmitted from the point of sale location to a rewards platform over a payment card network.

The rewards platform then performs processing to determine an appropriate exchange rate to convert Facebook Credits into Best Buy value, and then transmits one or more transaction authorization requests to Facebook and to Best Buy. The transaction authorization request transmitted to Facebook includes information and instructions to debit the consumer's Facebook Credits account by an amount of value equivalent to $100, and the transaction authorization request transmitted to Best Buy includes information and instructions to credit the consumer's Best Buy account by an amount of value equivalent to $100. If the consumer's Facebook Credits account does not have sufficient funds, the transaction may be declined and a decline message may be transmitted to the point of sale location for display to the consumer. If the transactions are authorized, the rewards platform may perform settlement processing to ensure that funds are appropriately transferred from Facebook to Best Buy. The result is a system and method which allows reward transactions to occur using existing point of sale locations and payment network processing systems. Other illustrative, but not limiting, examples will be described herein.

Figure 1:
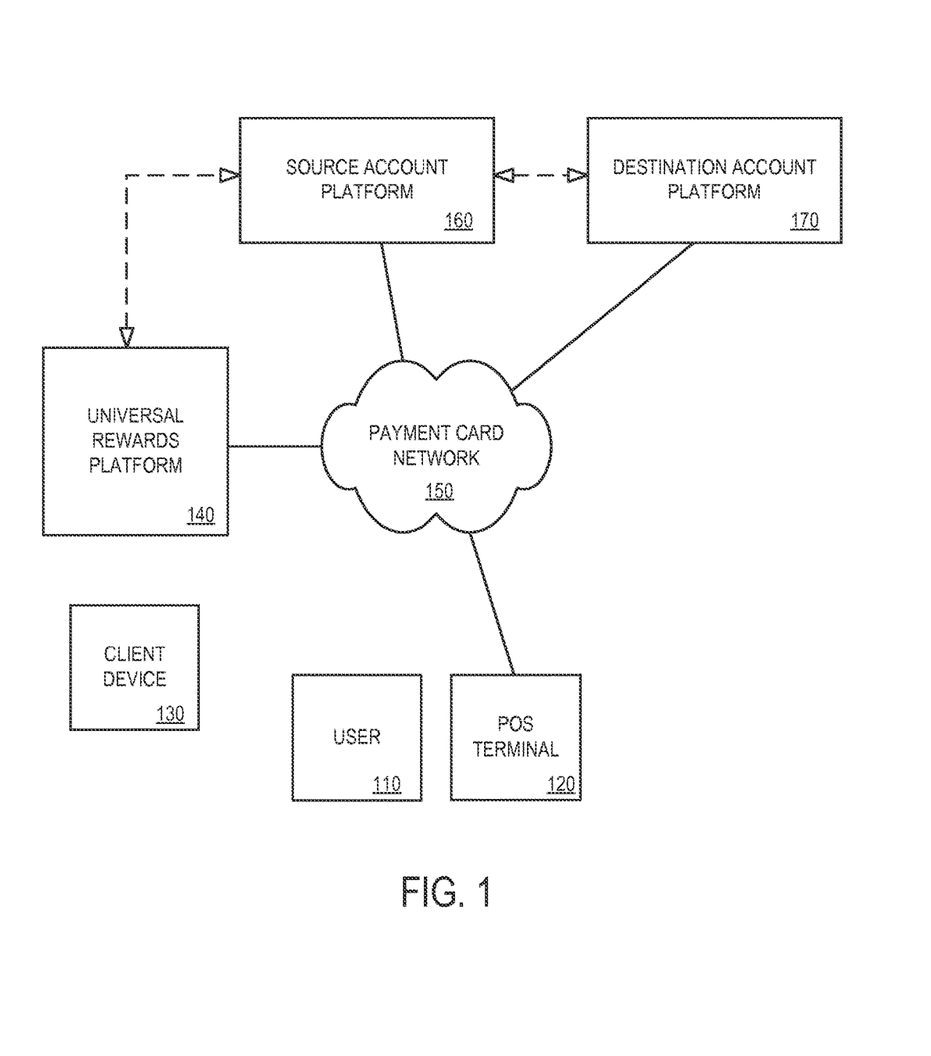
FIG. 1 is a block diagram that illustrates a system provided according to some embodiments of the present invention.

FIG. 1 is a block diagram that illustrates a system 100 provided according to some aspects of the present invention. As depicted, the system 100 includes a payment card network 150 which allows communication between a number of devices, including a universal rewards platform 140, a plurality of point of sale ("POS") terminals 120, a source account platform 160 and a destination account platform 170. As will be seen, the payment card network 150 operates to route transfer requests received from users 110 interacting with POS terminals 120 or with other client devices 130 (such as, for example, personal computers, mobile devices, or the like) to cause value to be transferred between one or more source account(s) associated with one or more source account platform(s) 160 and one or more destination account(s) associated with one or more destination account platform(s) 170.

In general, the system 100 depicted in FIG. 1 can be considered as showing the devices involved in a single funds transfer transaction pursuant to the present invention (e.g., a user 110 initiates a request via a POS terminal 120 or a client device 130 which causes funds to be transferred from a source account at source account platform 160 to a destination account at a destination account platform 170). Those skilled in the art, upon reading this disclosure, will appreciate that the system 100 will support many such transactions and interactions and will involve interactions between many different devices and accounts.

The POS terminal 120 may be any terminal, computer, or other device associated with a merchant or merchant location. For example, the POS terminal 120 may be a terminal at a physical point of sale location. As another example, the POS terminal 120 may be an electronic shopping cart or other transaction page accessible over the Internet by a consumer operating a computing device. Pursuant to some embodiments the POS terminal 120 is in communication (either directly or indirectly) with a payment card network 150 and may transmit and receive authorization messages using the payment card network 150.

Figure 3:
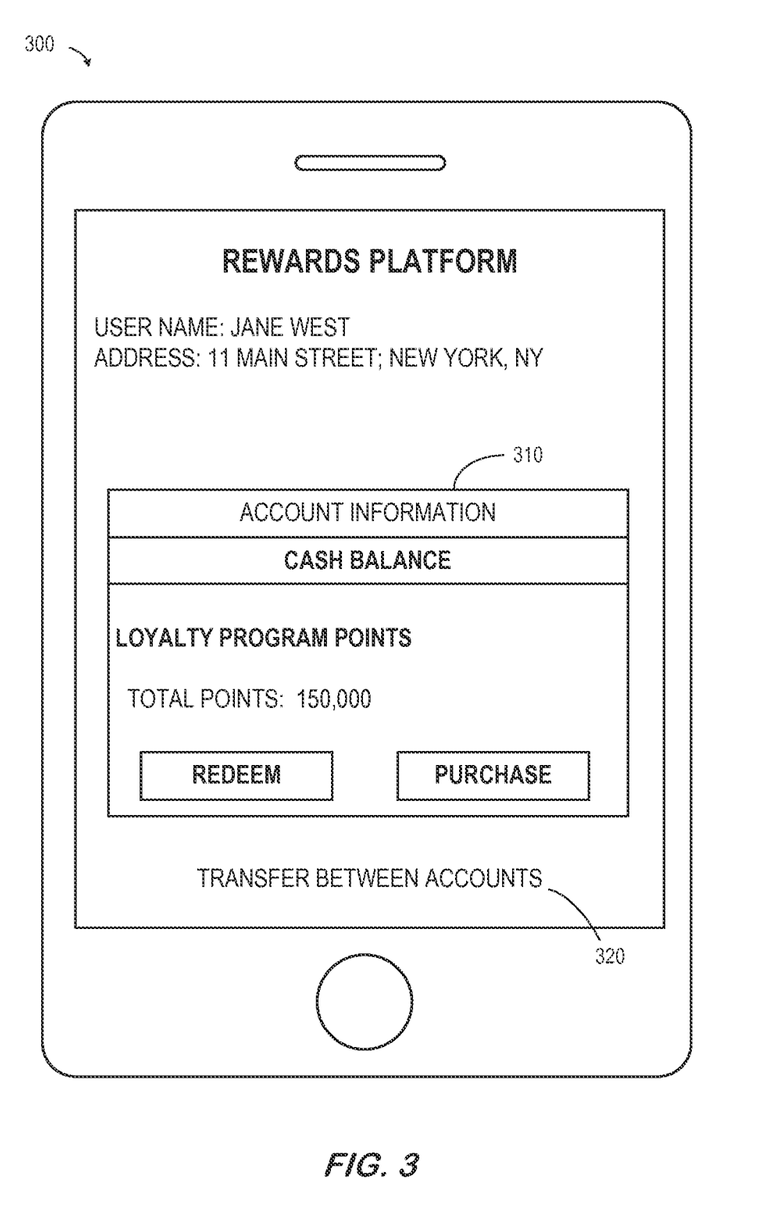
FIG. 3 is a screen display that may be presented to a user to perform a transaction pursuant to some embodiments.

The client device 130 may be any of a number of different types of devices that allow for wired or wireless communication with the universal rewards platform 140. For example, the client device 130 may be a mobile telephone, PDA, personal computer, or the like. For example, the client device 130 may be an iPhone® from Apple, Inc., a BlackBerry® from RIM, a mobile phone using the Google Android® operating system, a portable or tablet computer (such as the iPad® from Apple, Inc.), or the like. Pursuant to some embodiments, the device 130 may be operated to prompt for and capture data associated with a user's instructions in order to cause a transfer of value from a source account to a destination account. An illustrative, but not limiting user interface that may be used with device 130 is shown in FIG. 3 and will be discussed below.

Some or all of the devices of FIG. 1 may interact via one or more networks including a payment card network 150. Some or all of the devices may also communicate over additional wired and/or wireless networks. As an example, a wireless network can be a cellular network (e.g., in the case where a client device 130 is a smartphone, and the communication is between the device and the universal rewards platform 140). As another example, one or more devices may communicate over Internet protocol networks (for example, communication between a client device 130 and a rewards platform 140 may be via the Internet).

One example of a suitable payment card network 150 is the Banknet system, which is well-known to those who are skilled in the art, and which is operated by the assignee hereof. While the use of a payment card network 150 is described herein, embodiments may also be deployed using other processing networks to route transaction requests. A major advantage of the use of a payment card network such as the Banknet system is that it interlinks numerous financial institutions and other entities around the world. In practice the system 100 may include many financial institutions that act as issuers of payment card accounts, as well as a number of entities that act as issuers of different types of accounts (e.g., such as accounts holding non-governmental currency, such as reward or loyalty points or the like). For purposes of illustration only two such entities are shown in FIG. 1, namely the entity associated with a source account platform 160 and the entity associated with a destination account platform 170. As discussed further herein, in some embodiments, during a transfer pursuant to the invention, neither the source nor the destination account need be an account holding cash value. Instead, one or both of the source and the destination accounts may be accounts storing some other type of value.

The universal rewards platform 140 may be operated by, or on behalf of, an entity that establishes relationships with a number of entities that wish to allow value transfers pursuant to the present invention to be conducted. For example, in one embodiment, the platform 140 may be operated by or on behalf of an entity such as the assignee hereof. In some embodiments, some or all of the components of the system 100 may be operated by or on behalf of other entities.

Data received from client devices 130, POS terminals 120, source account platform 160, destination account platform 170, and payment card network 150 may be used by the universal rewards platform 140 to perform value transfers between accounts. In some embodiments, the rewards platform 140 uses a database of exchange rate information that is used to identify the appropriate exchange or conversion rate to be applied to individual transfer requests. he exchange rate database may be updated on a regular basis, as different loyalty or reward point providers (including the source account platform 160 and the destination account platform 170) add or change the valuation of their schemes. The rewards platform 140 may also be operated to define single consumer accounts that have account balances associated with different types of value. For example, a consumer may have an account on the rewards platform 140 that is linked to several loyalty programs as well as to her credit card or debit card account. The account on the rewards platform 140 may automatically convert each of the loyalty program balances into a common currency (for example, the common currency may be selected to be U.S. dollars).

Interaction between the rewards platform 140 and the various loyalty or reward provider platforms (including platforms 160, 170) may be provided through either or both of: (1) application programming interfaces ("APIs"), or (2) messaging facilitated by the payment card network 150. For example, in some embodiments, the rewards platform 140 may interact with a reward provider through an API provided by the rewards provider. The API may include functions such as balance checking, crediting an account, debiting an account or the like. In such embodiments, a reward transfer process may include a first communication leg between the consumer and the rewards platform 140 (which may be performed between a POS terminal 120 and rewards platform 140 over a payment card network 150 or between a client device 130 and rewards platform 140 over an Internet communication channel), and a second communication leg between the rewards platform 140 and a platform 160, 170. The second communication leg may be performed using an API defined by the rewards platform 140 or by a platform 160, 170.

For example, an API may be defined to receive current account balance information from each of a plurality of reward or loyalty programs. APIs may also be defined to transmit transfer requests to source account platform 160 to initiate funds transfers pursuant to the present invention (as well as to receive funds transfer response data from destination account platform 170). As an example, in a situation where a source account platform 160 has an API, a request to transfer value from an account at the source account platform 160 may proceed as follows. A request to transfer value may be received by the rewards platform 140 from a consumer. The request may identify the consumer's source account information (including, for example, an account number, user name, and/or password), as well as a requested amount of value to be transferred. The rewards platform 140 may then create an API call to the source account platform 160 using stored information associated with the source account platform API instructing the source account platform 160 to debit the consumer's account in the amount of the requested amount of value (which amount may be first converted into an amount to be debited based on one or more exchange rate rules stored in the rewards platform 140). The source account platform 160 may respond with a confirmation or decline API response. For example, a confirmation response may be issued by the source account platform 160 in the event that the consumer's account has sufficient value to cover the requested amount of value to be transferred. A decline response may be issued in the event that the consumer's account does not have sufficient value, or if the consumer's source account information cannot be validated (e.g., the password is incorrect, or the like).

In a similar manner, the rewards platform 140 may interact with a destination account at a destination account platform 170 in order to credit funds to a consumer's account the destination account platform 170. For example, if a request to transfer value is received by the rewards platform 140 from a consumer, the request may include information identifying the consumer's source account (which may be debited as described above) as well as information identifying the consumer's destination account. The rewards platform 140 may store information associated with an API of the destination account platform 170 and may generate an API call which causes a credit transaction to be performed in which an amount of value is credited to the consumer's destination account. The amount of value may be determined based on exchange rate information stored at (or accessible to) the rewards platform 140, and the API call may include consumer account information (including an account number, account name, and/or a password) and an amount to be credited. The destination account platform 170 may respond to the API call with an authorization or a decline, where an authorization may be issued in the event that the credit transaction was processed properly. A decline may be issued if the consumer account credentials are invalid (e.g., the password was incorrect) or if the credit transaction is unable to be processed (e.g., the amount of value exceeds the amount able to be credited to the account, or the like). In some embodiments, the API calls may be timed or staged such that an authorization from the source account platform 160 must be received prior to making the API call to credit the destination account. In some embodiments, additional API methods may be provided which allow the rewards platform 140 to obtain other information about accounts. For example, a pre-authorization method may be provided which allows the rewards platform 140 to pre-authorize a transaction without committing funds. In such an example, the rewards platform 140 may perform a pre-authorization of the source and/or the destination account to confirm that the transaction is capable of being performed (e.g., to avoid situations where the debiting of the source account is successful but the crediting of the destination account fails). In other embodiments, API methods such as balance inquiry transactions may be provided to allow consumers to request their balance from multiple accounts in a single interaction with rewards platform 140.

As described above, interaction between the rewards platform 140 and the various loyalty or reward provider platforms (including platforms 160, 170) may be provided through either or both of: (1) application programming interfaces ("APIs"), or (2) messaging facilitated by the payment card network 150. In situations where the interaction between the rewards platform 140 and reward provider platforms 160, 170 is performed over the payment card network 150, such communications may be performed using ISO 8583 compliant messages routed over the payment network. For example, each account platform 160, 170 may be assigned a unique identification number (such as a bank identification number or the like), allowing the rewards platform 140 to issue rewards transaction messages which specify the account platform 160, 170 to which the message is directed.

For example, a transaction to debit an amount of value from a source account may generally proceed as follows. The rewards platform 140 may receive a request to transfer value from a source account to a destination account. This request may be received from a client device 130 or from a POS terminal 120. In the example where the request is received from a POS terminal 120, the request may be received over the payment card network 150 in the form of an ISO 8583-compliant authorization request message. The authorization request message may include routing information which causes the request to be routed to the universal rewards platform 140 (e.g., a BIN or other routing identifier may be appended to the request message allowing the POS terminal 120 to route the request to the rewards platform 140 for further processing). The request message may also include information identifying a requested transfer amount as well as information identifying the consumer's source account identifier (such as an email address or the like) and password, as well as information identifying the consumer's destination account identifier (such as an email address or the like) and password.

The rewards platform 140 may perform a conversion (using stored exchange rates) to determine an amount of value to be debited from the source account and a corresponding amount of value to be credited to the destination account. The source account platform and the destination account platform may be identified from information included in the authorization request message received from the client device 130 or the POS terminal 120. The rewards platform 140 may then generate a transaction request message which includes: the BIN or routing identifier of the source account platform 160, the consumer's account information to be debited (including the account name or identifier and password), and the amount of value to be debited (in the currency of the source platform). The transaction request message may then be routed from the rewards platform 140 over the payment card network 150 to the source account platform 160 which then processes the transaction request. If the transaction can be processed, an authorization response message confirming the debiting is routed back to the rewards platform 140 over the payment card network 150. If the transaction cannot be processed (e.g., insufficient value exists in the consumers source account, or the account credentials were incorrect), the response message may be a transaction decline (which may provide reasons for the decline). Similar processing may occur to cause value to be credited to the destination account. Pursuant to some embodiments, similar transaction processing between the rewards platform 140 and one or more account platforms 160, 170 may be performed to obtain account-related information such as account balance information or the like. Further, pre-authorization transactions may be used to ensure that an account is not debited if a requested destination account is unable to receive a credit of the value. In this manner, embodiments allow existing payment networks to be used to perform rewards processing pursuant to the present invention.

Pursuant to some embodiments, data may be transmitted between devices using a wired or wireless network. In some embodiments, some, or all, of the data may be transmitted using other network communication techniques (e.g., such as satellite communication, RFID, or the like). In some embodiments, some or all of the data transmitted between devices may be encrypted or otherwise secured to prevent intrusion.

Continuing with the concept that FIG. 1 shows components of the funds transfer system 100 with respect to a single funds transfer transaction, a request for a transfer may be initiated by a user 110 interacting with a device (such as a POS terminal 120 or a client device 130). The device from which the funds transfer request originates may come in a number of different forms, such as the sender's mobile telephone, an automatic teller machine (ATM), a personal computer or other web-browsing device, or a POS terminal 120. As another alternative, the user may interact with an agent (such as a clerk operating a point of sale device) to request a transfer to be performed (for example, a clerk, in response to the user's request, may operate a terminal to initiate the transfer request).

Figure 2:
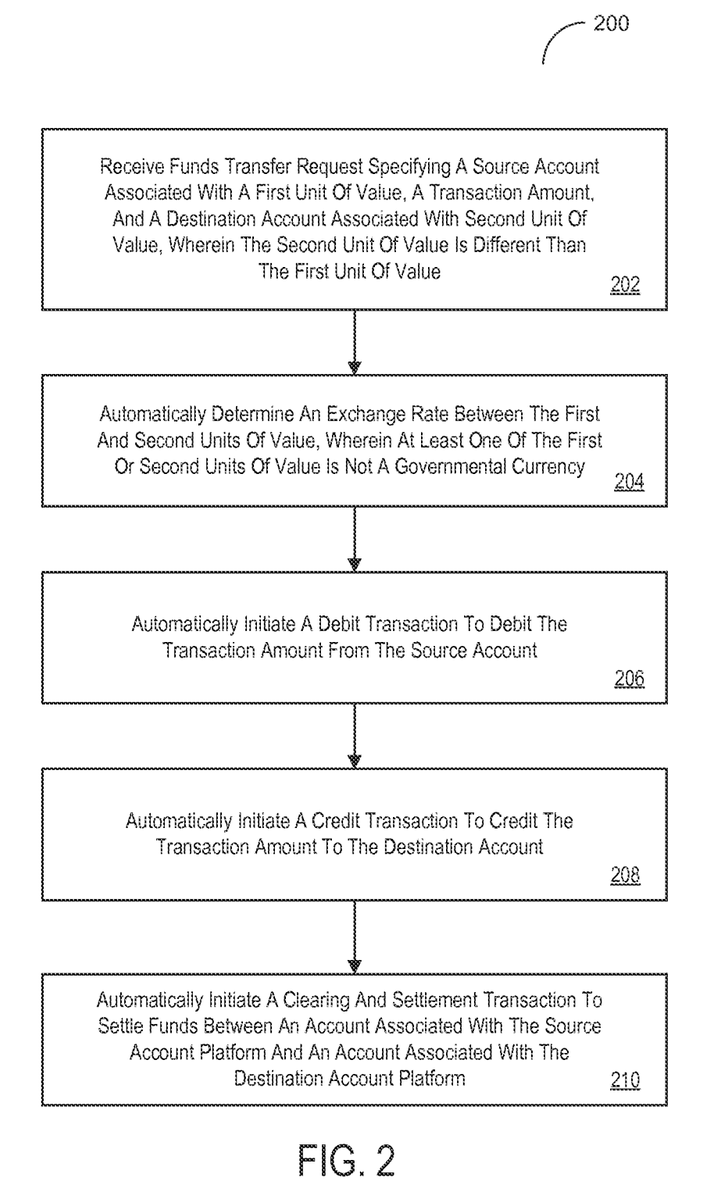
FIG. 2 is a flow chart that illustrates a transaction process that may be performed by a system pursuant to some embodiments.

Reference is now made to FIG. 2 where a flow chart illustrating a value transfer process 200 is depicted. This process may be implemented with software on one or more of the universal rewards platform 140, the client device 130 or the POS terminal 120. For example, in some embodiments, the process may be implemented under control by software on the universal rewards platform 140 via an HTTP connection with a client device 130. A similar connection may be provided for transactions initiated from a POS terminal 120. In other embodiments, the connection between the POS terminal 120 and the rewards platform 140 is through the payment card network 150 using ISO 8583-style messaging formats.

The process 200 begins at 202 with the platform 140 receiving a funds transfer request specifying a source account associated with a first unit of value, a transaction amount, and a destination account associated with a second unit of value. In some embodiments, the second unit of value is different than the first unit of value. A consumer may initiate a request to transfer funds by interacting with a user interface (such as the user interface described below in conjunction with FIG. 3) that allows a consumer (who has registered one or more loyalty or reward accounts with the platform or other type of virtual currency 140) to initiate a transfer of value between accounts. For example, a consumer who has an airline rewards point account and a credit card account may initiate a transfer request that causes value to be transferred from one account to the other, either to buy airline rewards points credits with their credit card, or to cash out airline rewards points that is credited to the consumer's credit card.

In some embodiments, the consumer may be presented with a variety of options when initiating a transfer request. For example, the consumer may be prompted to identify the source account as well as at least one destination account. The current account balance of each available source account may be displayed to the consumer, as well as information regarding the value of the account based on one or more conversion rates associated with the source account type and/or the destination account type.

Processing at 202 may be initiated in a number of different ways. For example, in some embodiments, the processing may be initiated based on the consumer's use of a payment card that has been registered for use in the universal rewards platform 140. As an illustrative example where a consumer has registered a credit card with the rewards platform 140, the use of the credit card at a POS terminal 120 to conduct a purchase transaction may cause a message to be transmitted to the rewards platform 140 (e.g., as part of an authorization process or the like), where the rewards platform 140 identifies the credit card or account number as belonging to a consumer participating in the reward value transfer program of the present invention. The rewards platform 140 may return information associated with related accounts (such as the current balance of a reward account) to the POS terminal 120 for display to the consumer. The consumer may then interact with a menu or display of options presented by the POS terminal 120 to select a desired action (such as to transfer value from a source account to a destination account).

Processing at 202 may also be initiated by a consumer in other ways. For example, a consumer may interact with reward platform 140 via a client device 130 (such as a mobile phone or personal computer) to select a value transfer option. An illustrative user interface of such an interaction is shown and described below in conjunction with FIG. 3.

Processing continues at 204 where the system is operated to automatically determine an exchange rate between the first and the second units of value. For example, once a consumer has selected a source account and a destination account, the platform 140 may automatically determine the appropriate exchange rate to apply to the transaction. In some embodiments, at least one of the first or second units of value is not a governmental currency (e.g., the source account may be, for example, an airline reward mile account, and the destination account may be a bank account, or vice versa). Embodiments of the present invention allow a wide variety of types of units of value to be transferred between disparate accounts. For example, the units of value may be a virtual currency (such as points usable only in a virtual transaction, such as credits for game play on Zynga® or the like), a social network currency (such as points usable only on one or more social networks), a credit account (such as a MasterCard credit card), a debit account (such as a bank account, or a prepaid debit card account), reward points (such as points valid at a merchant location or chain), store credit (such as a closed-loop gift card account), airline reward miles, or credit card reward points. Each of these different types of value may have an associated exchange rate that is stored and maintained at the platform 140.

Once the source and destination accounts and the appropriate exchange rate(s) have been identified, processing continues at 206 where the system is operated to automatically initiate a debit transaction to cause the transaction amount to be debited from the source account. In some embodiments, the debit transaction is accomplished via a payment card system or network (such as the network 150 of FIG. 1). For example, the debit transaction may be initiated by the rewards platform 140 creating an authorization request message which includes the transaction amount, information identifying the source account platform 160 (such as a routing identifier associated with the source account platform 160), and information identifying the consumer's account at the source account platform 160. The authorization request message is routed to the source account platform 160 and the source account platform 160 processes the request to determine whether to authorize or decline the transaction.

If the debit transaction is successful (e.g., the source account platform 160 authorizes the transaction), processing may continue at 208 where the rewards platform 140 automatically initiates a credit transaction to credit the transaction amount to the destination account of the consumer. For example, the credit transaction may be initiated by the rewards platform 140 creating an authorization request message which includes the transaction amount, information identifying the destination account platform 170 (such as a routing identifier associated with the destination account platform 170), and information identifying the consumer's account at the destination account platform 170. The authorization request message is routed to the destination account platform 170 and the destination account platform 170 processes the request to determine whether to authorize or decline the transaction.

If the transaction is authorized by the destination account platform 170 (e.g., the destination account is available to be credited in the amount of the transaction amount), processing may continue at 210 where the rewards platform automatically initiates a clearing and settlement transaction to settle funds between a financial account associated with the source account platform 160 and a financial account associated with the destination account platform 170. For example, the settlement processing may be performed on a batch or real time basis and may cause funds to be moved from a bank associated with the source account platform 160 and a bank associated with the destination account platform 170.

In some embodiments, the payment transaction may be processed via an intermediary account which serves to hold the funds for clearing and settlement (e.g., to ensure that the value from the source account is properly cleared and settled before releasing the funds to the destination account). For example, the payment transaction may be processed via a demand deposit account, a debit clearing account, an automated clearinghouse transaction, or via a web platform (such as platform 140) to facilitate clearing and settlement.

FIG. 3 shows an example of a user interface 300 that may be presented to a consumer operating a client device 130 to interact with a rewards platform 140 to initiate a transfer of value between a source account and a destination account (e.g., as described above in conjunction with FIG. 2). As shown, the client device 130 is a mobile phone, such as an Apple iPhone® or the like. A number of other user interfaces may be provided to allow user interaction with any of the flows or processes described herein, and the user interface of FIG. 3 is provided for illustration only. As shown, a user may be presented with a number of items of data associated with the user's account established on the reward platform 140. In some embodiments, prior to viewing account information, the user may be required to create an account and provide information about one or more source and destination accounts (such as a credit card account, reward accounts numbers, email address (ID for a rewards account), etc.).

Data displayed to the user may include, for example, a user name, account information 310, including a current account balance (which may be displayed, for example, in a converted form, such as U.S. dollars, or in the source form, such as a number of points or the like). The user may be presented with one or more options to interact with the account, including redeeming the value (e.g., by transferring the value from a source account to a destination account), purchasing additional points or value, or transferring value between accounts 320. Selection of one or more of the options may cause a process to occur, such as the process described above in conjunction with FIG. 2.

In some embodiments, the user interface and display presented to the user may be provided in a downloadable application (or "app") installed on the client device 130. For example, in the case where the client device 130 is a mobile phone, the download and install may be performed from the mobile phone or from a desktop computer in communication with the mobile phone. The application may be downloaded from the reward platform 140 or from an application marketplace.

Figure 4:
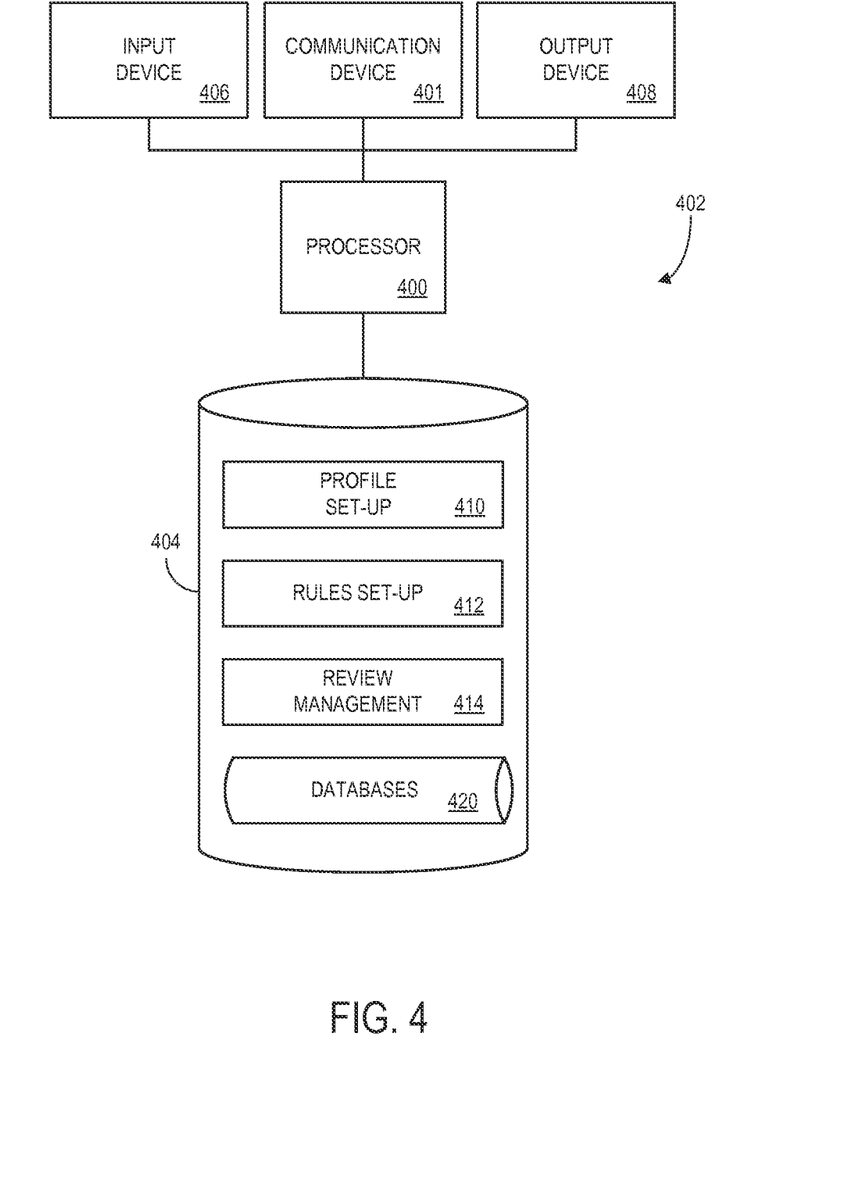
FIG. 4 is a block diagram that illustrates an embodiment of a rewards platform computer that may be part of the system of FIG. 1.

FIG. 4 is a block diagram that illustrates an embodiment of the universal rewards platform 140. In some embodiments, the platform 140 may be deployed as one or more server computers 402. The server computer 402 may be conventional in its hardware aspects but may be controlled by software to cause it to operate in accordance with aspects of the present invention.

The server computer 402 may include a computer processor 400 operatively coupled to a communication device 401, a storage device 404, an input device 406 and an output device 408.

The computer processor 400 may be constituted by one or more conventional processors. Processor 400 operates to execute processor-executable steps, contained in program instructions described below, so as to control the server computer 402 to provide desired functionality. Communication device 401 may be used to facilitate communication with, for example, other devices (such as the other computers or devices shown in FIG. 1).

Input device 406 may comprise one or more of any type of peripheral device typically used to input data into a computer. For example, the input device 406 may include a keyboard and a mouse. Output device 408 may comprise, for example, a display and/or a printer.

Storage device 404 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory.

Storage device 404 stores one or more programs for controlling processor 400. The programs comprise program instructions that contain processor-executable process steps of server computer 402, including, in some cases, process steps that constitute processes provided in accordance with principles of the present invention, as described in more detail herein (such as, for example, the process of FIG. 2).

The programs may include an application/program module 410 that allows administrative personnel to set up profiles that are to be stored in the server computer 402 to define exchange rates or conversion information associated with each of a plurality of different types of value (e.g., such as exchange rates associated with different types of loyalty or reward programs allowing value to be converted into or from those programs). For example, in some embodiments, program managers or administrators associated with individual source/destination account platforms 160, 170 may interact with the rewards platform 140 to set or manage exchange rates. In some embodiments, each currency (associated with a platform 160, 170) may have a conversion rate or exchange rate based on a common currency (such as, for example, the U.S. dollar). As an illustrative example, an operator or provider of virtual currency (such as Facebook Credits) may determine that each unit of value of the virtual currency is equivalent to a set number of units of the common currency. For example, an exchange rate of 1 unit of virtual currency may be equal to $0.05, or 1 unit of virtual currency may be equal to $1 or the like. The programs may also include an application/program module 412 that allows administrative personnel to establish various rules for value transfer transactions. Such rules may include assignment of fee profiles to certain classes of value transfer transactions.

In some embodiments, the conversion may be performed during settlement processing (such as described at step 210 of FIG. 2 above).

Further applications/program modules may be provided to perform other administrative tasks. For example, an application program/module 414 may be provided to implement data queries or reports regarding value transfer activities performed using the present invention. As indicated at 420, the storage device 404 may store one or more databases of information relevant to value transfer activities.

In addition to the software programs expressly listed above, the server computer 404 may be programmed with other software, such as one or more operating systems, device drivers, database management programs, programs to enable the server computer 404 to perform web hosting functions, etc.

Figure 5:
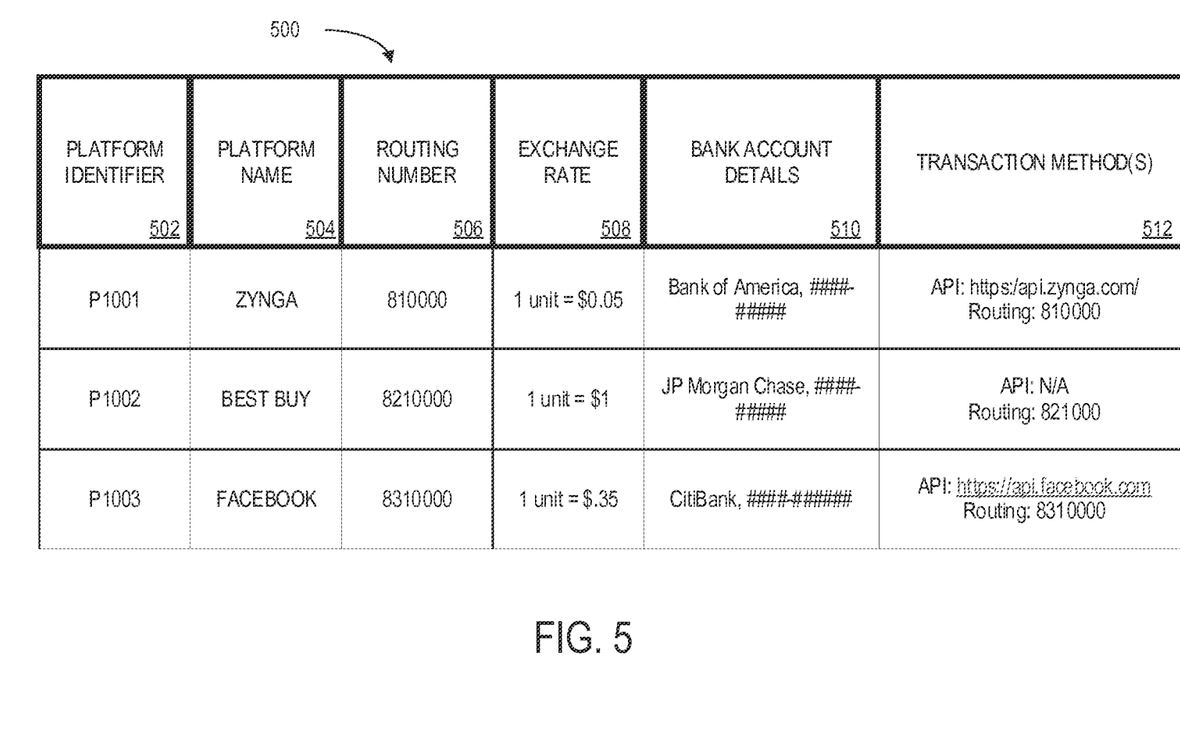
FIG. 5 is a block diagram that illustrates a portion of a database accessible by the rewards platform computer of FIG. 4.

Referring now to FIG. 5, a table represents a reward platform database 500 that may be stored at (or accessible by) reward platform 140. This database is described in detail below and depicted with exemplary entries in the accompanying figure. As will be understood by those skilled in the art, the schematic illustrations and accompanying descriptions of the databases presented herein are exemplary arrangements for stored representations of information. A number of other arrangements may be employed besides those suggested by the table shown. Similarly, the illustrated entries of the database represent exemplary information only. Those skilled in the art will understand that the number and content of the entries can be different from those illustrated herein.

Database 500 (as depicted) includes entries identifying a number of different reward account platforms 160, 170, their exchange rates, and information usable to submit credit and debit transactions as well as settlement information identifying one or more financial institutions associated with each platform. Each of the platforms 160, 170 may be registered with rewards platform 140. Each platform has a platform identifier 502, a platform name 504, a routing number 506 (which may be used in order to route credit and debit transactions to the platform for authorization), an exchange rate 508, bank account details 510 (identifying one or more banks with which funds are to be settled on behalf of the platform), and one or more supported transaction methods 512. Each of the reward account platforms 502 may permit value to be deposited (e.g., may act as a destination account) and value to be debited (e.g., may act as a source account). Pursuant to some embodiments, the information stored in database 500 is encrypted and stored in one or more secure tables. Each user account is identified by information such as an account number (which, in the case of a credit card account, may be the primary account number or "PAN", and in the case of a loyalty account may be an account ID, such as an email address or the like). Each account may also be associated with a name of the entity or program (such as a name of the rewards or loyalty program, etc.) 504, as well as exchange or conversion rate information 508 (which may be set or updated by an administrator associated with the account provider or an administrator of the platform 140). Pursuant to some embodiments, information identifying which of one or more transaction methods 512 is supported by the provider may also be specified. For example, as described above, in some embodiments, a provider may support one or both of an API transaction method and a payment card network transaction method. Database 500 may store or have access to credentials or other information associated with each of the supported transaction methods of a provider. For example, in situations where an API transaction method is supported, database 500 may store or have access to API credentials and code which allow transactions to be performed over the API. As another example, in situations where a payment card network transaction method is supported, database 500 may store a routing number or other information used to route transaction messages to the provider.

Database 500 may store or have access to other information not shown. For example, in some embodiments, the database 500 may store transaction data associated with individual transactions processed by the rewards platform 140.

The information in database 500 may be created and updated, for example, based on information received from a user. In some embodiments, system 100 includes one or more maintenance terminals which allow authorized individuals to update, modify, and otherwise maintain information and rules utilized by the system. The information in database 500 may also be associated with one or more exchange rate or conversion tables, each defining the conversion rate to convert a given type of value to another (such as to a reference currency).

As used herein and in the appended claims, "displaying" a screen display includes downloading a webpage from a server computer for display on a client computer.

It is noted that "payment transaction" is a term of art in the field of payment card systems, and refers to a transaction in which—in contradistinction to a purchase transaction—funds flow from an acquirer to an issuer as a credit to a payment card account issued to the issuer.

The flow charts and descriptions thereof herein should not be understood to prescribe a fixed order of performing the method steps described therein. Rather the method steps may be performed in any order that is practicable.

As used herein and in the appended claims, the term "payment card account" includes a credit card account or a deposit account that the account holder may access using a debit card. The term "payment card account number" includes a number that identifies a payment card account or a number carried by a payment card, or a number that is used to route a transaction in a payment system that handles debit card and/or credit card transactions. The term "payment card" includes a credit card or a debit card.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A computer-implemented method, comprising:
   receiving, at a universal platform, a funds transfer request from an electronic device, the funds transfer request specifying a source account at a source account platform associated with a first unit of value, a transaction amount, and a destination account associated with a second unit of value, wherein the second unit of value is of a different type than the first unit of value and wherein the source account and the destination account belong to a single user; and
   responding to the funds transfer request by:
   automatically determining, by a processor of the universal platform, an exchange rate between the first and second units of value by using a database of exchange rate information, wherein the exchange rate information associating the first and second units of value is stored in one or more secure tables associated with the database at the universal platform, and wherein at least one of the first or second units of value is not a governmental currency,
   automatically converting, by the processor, the transaction amount from the first unit of value to the second unit of value based on the exchange rate;
   pre-authorizing, by the universal platform, at least one of the source account and the destination account
   after pre-authorizing the source account, automatically initiating, by the processor, a debit request to debit the transaction amount from the source account,
   after pre-authorizing the destination account, automatically initiating, by the processor, a credit request to credit the converted transaction amount to the destination account.

2. The method of claim 1, wherein each of the debit request and the credit request are processed using at least one of an API interaction over the Internet and a payment transaction message over a payment network.

3. The method of claim 1, wherein the first unit of value comprises a governmental currency and the second unit of value is associated with at least one of: (i) a virtual currency, (ii) a social network currency, (iii) a credit account, (iv) a debit account, (v) rewards points, (vi) store credit, (xii) airline reward miles, or (xiii) credit card reward points.

4. The method of claim 1, wherein the second unit of value comprises a governmental currency and the first unit of value is associated with at least one of: (i) a virtual currency, (ii) a social network currency, (iii) a credit account, (iv) a debit account, (v) rewards points, (vi) store credit, (xii) airline reward miles, or (xiii) credit card reward points.

5. The method of claim 1, wherein neither the first nor second units of value comprise a governmental currency.

6. The method of claim 1, wherein the funds transfer request was initiated via a point of sale terminal.

7. The method of claim 6, wherein the funds transfer request further includes a personal identification number associated with the source account.

8. The method of claim 1, wherein the funds transfer request was initiated via a request from a user associated with the source account to a vender.

9. The method of claim 8, wherein, responsive to the initiation by the user, the vendor transmits the funds transfer request to the payment card system.

10. The method of claim 1, further comprising:
    subsequently receiving, at the payment card system, a payment transaction; and
    associating the payment transaction with the prior funds transfer request.

11. The method of claim 1, wherein the funds transfer request specifies a unique personal identifier not including a source account identifier, and further wherein said responding includes:
    determining the source account mapped to the unique personal identifier,
    initiating the payment transaction to transfer the transaction amount from the source account to a payment card system settlement account that was established by the payment card system with an agent bank, and
    issuing an instruction for the agent bank to transfer the transaction amount from the settlement account to the destination bank account.

12. The method of claim 11, wherein the payment transaction is to be routed to the payment card system settlement account via the payment card system.

13. The method of claim 11, wherein the source account is a payment card account.

14. The method of claim 1, wherein at least one of the source or destination accounts is associated with multiple currencies, including at least two of: (i) a virtual currency, (ii) a social network currency, (iii) a credit account, (iv) a debit account, (v) rewards points, (vi) store credit, (xii) airline reward miles, or (xiii) credit card reward points.

15. The method of claim 14, further comprising:
displaying to a user associated with at least one account a summary display listing balances associated with the multiple currencies.

16. The method of claim 14, further comprising:
allowing the user to transfer balances between the multiple currencies.

17. A non-transitory, computer-readable medium storing program code executable by a computer to:
receive, at a universal platform, a funds transfer request from an electronic device, the funds transfer request specifying a source account at a source account platform associated with a first unit of value, a transaction amount, and a destination account associated with a second unit of value, wherein the second unit of value is of a different type than the first unit of value, and wherein the source account and the destination account belong to a single user; and
respond to the funds transfer request by:
automatically determining by the universal platform an exchange rate between the first and second units of value by using a database of exchange rate information, wherein the exchange rate information associating with the first and second units of value is stored in one or more secure tables associated with the database at the universal platform, and wherein at least one of the first or second units of value is not a governmental currency,
automatically converting the transaction amount from the first unit of value to the second unit of value based on the exchange rate,
pre-authorizing, by the universal platform, at least one of the source account and the destination account
after pre-authorizing the source account, automatically initiating a debit request to debit the transaction amount from the source account,
after pre-authorizing the destination account, automatically initiating a credit request to credit the converted transaction amount to the destination account.

18. The medium of claim 17, wherein each of the debit request and the credit request are processed using at least one of an API interaction over the Internet and a payment transaction message over a payment network.

19. The medium of claim 17, wherein at least one of the first or second units of value comprises: (i) a virtual currency, (ii) a social network currency, (iii) a credit account, (iv) a debit account, (v) rewards points, (vi) store credit, (xii) airline reward miles, or (xiii) credit card reward points.

20. A system, comprising:
a communication port to receive a funds transfer request from an electronic device, the funds transfer request specifying a source account at a source account platform associated with a first unit of value, a transaction amount, and a destination account associated with a second unit of value, wherein the second unit of value is of a different type than the first unit of value, and wherein the source account and the destination account belong to a single user; and
a universal rewards platform to respond to the funds transfer request by:
automatically determining an exchange rate between the first and second units of value by using a database of exchange rate information, wherein the exchange rate information associating with the first and second units of value is stored in one or more secure tables associated with the database at the universal platform, and wherein at least one of the first or second units of value is not a governmental currency,
automatically converting the transaction amount from the first unit of value to the second unit of value based on the exchange rate,
pre-authorizing, by the universal platform, at least one of the source account and the destination account,
after pre-authorizing the source account, automatically initiating a debit request to debit the transaction amount from the source account, and
after pre-authorizing the destination account, automatically initiating a credit request to credit the converted transaction amount to the destination account.

21. The system of claim 20, wherein each of the debit request and the credit request are processed using at least one of an API interaction over the Internet and a payment transaction message over a payment network.

22. The system of claim 20, wherein at least one of the first or second units of value comprise: (i) a virtual currency, (ii) a social network currency, (iii) a credit account, (iv) a debit account, (v) rewards points, (vi) store credit, (xii) airline reward miles, or (xiii) credit card reward points.

23. The method of claim 1, wherein the exchange rate between the first and second units of value is based on a common currency.

24. The method of claim 23, further comprising:
converting at least one of the first and second units of value to the common currency based on the exchange rate.

25. The method of claim 23, wherein each unit of value of the first and second units of value is equivalent to a set number of units of the common currency.

* * * * *

UNITED STATES PATENT AND TRADEMARK OFFICE
CERTIFICATE OF CORRECTION

| | |
|---|---|
| PATENT NO. | : 10,002,353 B2 |
| APPLICATION NO. | : 13/724628 |
| DATED | : June 19, 2018 |
| INVENTOR(S) | : Debbie Kimberg et al. |

Page 1 of 1

It is certified that error appears in the above-identified patent and that said Letters Patent is hereby corrected as shown below:

On the Title Page

(71) Applicant
Please removed Applicants:
Debbie Kimberg, Chesterfield, MO (US); Shawn Hagmeier, St. Peters, MO (US)

Please add Applicant's Name and Residence (City and State):
"MASTERCARD INTERNATIONAL INCORPORATED, PURCHASE, NY (US)"

Signed and Sealed this
Twenty-eighth Day of May, 2019

Andrei Iancu
*Director of the United States Patent and Trademark Office*